United States Patent [19]

MacNeal

[11] Patent Number: 4,500,176

[45] Date of Patent: Feb. 19, 1985

[54] METHOD AND DEVICE FOR IMPROVING A CONDUCTIVE SWITCHING GRID FOR SWITCHABLE MAGNETIC ELEMENTS

[75] Inventor: Bruce E. MacNeal, Fullerton, Calif.

[73] Assignee: Litton Systems, Inc., Beverly Hills, Calif.

[21] Appl. No.: 375,326

[22] Filed: May 5, 1982

[51] Int. Cl.³ .............................................. G02F 1/09
[52] U.S. Cl. ....................................... 350/376; 365/2
[58] Field of Search ............... 350/376, 375, 377, 378; 204/192 M; 365/2, 35, 37; 360/114

[56] References Cited

U.S. PATENT DOCUMENTS 4,012,724   3/1977   Hanson et al. ........................ 365/2

Primary Examiner—Bruce Y. Arnold
Assistant Examiner—William Propp

[57] ABSTRACT

An improved conductive grid for a magneto-optic display is shown having individual magnetic and transparent post elements separated from one another by an orthogonal grid-like pattern. Conductors are deposited in each vertical separation and every other horizontal separation. A first region of low anisotropy material compared to the high anisotropy material of each post element is located in close proximity to the intersection of each vertical and horizontal conductor.

15 Claims, 4 Drawing Figures

U.S. Patent  Feb. 19, 1985  4,500,176
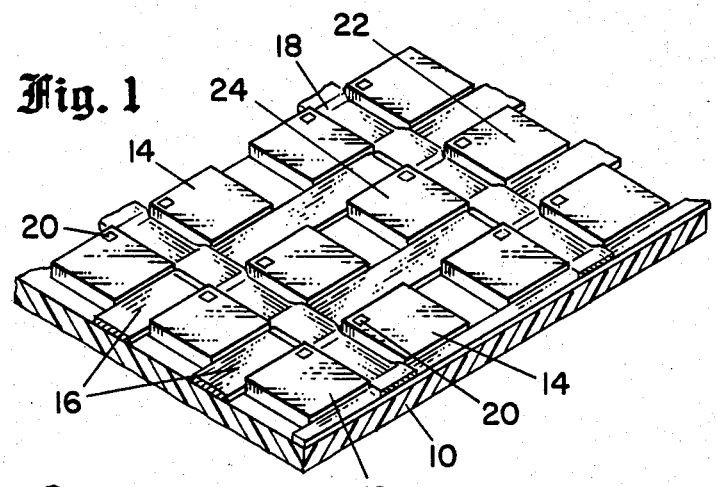
Fig. 1
Fig. 2
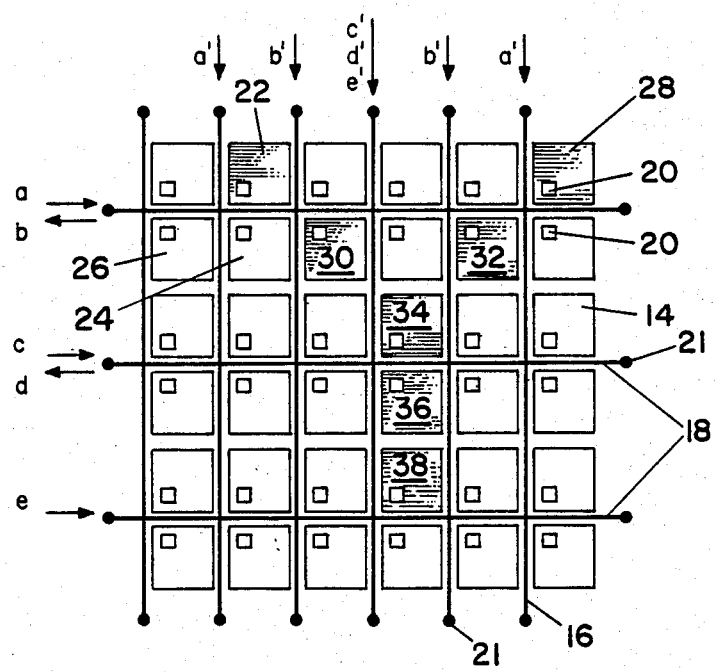
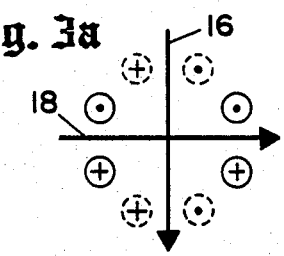
Fig. 3a
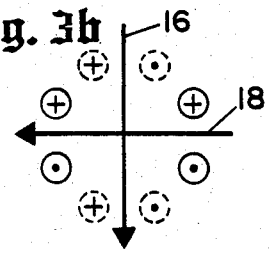
Fig. 3b

METHOD AND DEVICE FOR IMPROVING A CONDUCTIVE SWITCHING GRID FOR SWITCHABLE MAGNETIC ELEMENTS

FIELD OF THE INVENTION

The present invention relates to a method and device for improving the conductive switching grid for switchable magnetic elements and, more particularly, to an improved grid pattern which eliminates every other electrical conductor in one direction of the grid yet permits switching of each magnetic element formed by the grid pattern.

BACKGROUND OF THE INVENTION

It is well known that the direction of magnetization of a magnetic material can be reversed or switched by impressing an external magnetic field of opposite polarity on the material. Typically, magnetic material may be placed upon a nonmagnetic substrate and then divided or separated into a grid-like pattern to create magnetic post elements. When electric conductors are placed within the separations which form the grid-like pattern, electric currents may be passed through these conductors for generating a magnetic flux about each conductor. When this flux is concentrated at the point of coincidence of two conductors, the concentrated flux may be used to reverse the magnetization of the post element.

If the magnetic post element and its nonmagnetic substrate are structured from transparent materials and the post element material exhibits the Faraday effect, it is possible to create a magneto-optic display by passing polarized light through the transparent post element and then through an analyzer.

Examples of prior art devices for switching the direction of magnetization of magnetic post elements upon a nonmagnetic substrate to create a magnetic bubble domain memory device may be found in U.S. Pat. No. 3,715,736, issued Feb. 6, 1973 and in U.S. Pat. No. 4,114,191, issued Sept. 12, 1978. Yet, another prior art patent which uses an external field and coincident current selection of post elements in magneto-optic display may be found in British Pat. No. 1,180,334, published Apr. 5, 1968.

In order to establish a magnetic flux large enough to switch the magnetic post elements, it is often necessary to exceed a switching field value of sixteen thousand (16,000) Oersteds (Oe). A co-pending patent application entitled "Altering The Switching Threshold Of A Magnetic Material," filed Nov. 12, 1981, Ser. No. 320,819, which is assigned to the assignee of the present invention, discloses a method and device for reducing the required switching fields by the formation by implantation of a low anisotropy material within a high anisotropy material which forms the post element.

The first region of relatively low anisotropy characteristics, when compared to the high anisotropy characteristics of the post element, is utilized to initiate the switching of the direction of magnetization of the post element. When the magnetic field is reversed, the first region of low anisotropy material will reverse its magnetization, thereby creating a domain wall which will move through the low anistropy material to the interface between the first region of low anisotropy magnetic material and the high anisotropy magnetic material. The propagation of the domain wall then continues beyond the interface between low and high anisotropy material through the high anisotropy material. The completion of magnetic field reversal within a post element is thus accomplished by domain wall movement and not by coherent rotation of the magnetization. In this way, the full post element may be switched by a relatively low magnetic field, less than 200 Oe.

SUMMARY OF THE INVENTION

The utilization of a first region of low anisotropy material permits a reduced magnetic flux to accomplish post switching. This permits a reduction in the current requirements of the electrical conductors. If possible, it is also desirable to reduce the number of conductors.

Accordingly, a principal object of the present invention is to reduce, where possible, the number of current carrying conductors within a magnetic device such as a magneto-optic device.

To accomplish this and other objects, there is provided a nonmagnetic substrate upon which is placed a layer of magnetic material having a high anisotropy. The high anisotropy material is divided by a grid-like pattern of separations to form post elements between the separations. The separations are patterned in first and second sets directed generally in the X and Y directions. Conductive elements are then deposited within each separation of the first set arranged in the Y direction, for example; while, in the second set of separations, conductive material is placed in every other separation. A first region of low anisotropy material is then placed in each post element closest to the intersection of the conductive elements which have been placed in each separation in the first direction and in every other separation in the second direction. This arrangement permits the elimination of one-half of the conductors required in the second direction.

DESCRIPTION OF THE DRAWINGS

A better understanding of the objects and advantages of the present invention will be had after reference to the following specification and drawings, in which:

FIG. 1 is a perspective view showing the nonmagnetic substrate, magnetic post elements, and conductor elements utilized within the present invention;

FIG. 2 is a schematic drawing useful in explaining the operation of the magnetic device shown in FIG. 1; and FIGS. 3a and 3b are schematic diagrams illustrating the magnetic flux about a pair of coincident conductors.

DESCRIPTION OF THE PREFERRED EMBODIMENTS

Referring now to FIG. 1, a nonmagnetic and optically transparent substrate is shown at 10, which may be formed from a garnet material, such as gadolinium gallium garnet (GGG). Deposited upon the substrate is a layer of magnetic film 12, which may be deposited by the liquid phase epitaxy method and which may be one of several transparent films that demonstrate magnetic domain characteristics. Such a film may be created from iron garnet by substituting bismuth, aluminum or gallium and certain rare earth ions in the iron garnet film. The magnetic film 12 must be transparent to electromagnetic energy; however, the nonmagnetic substrate 10 may be opaque when used in a reflective mode.

The magnetic film 12 may be grown in a pattern of separations or deposited across the full surface of substrate 10 and then separated into a grid-like pattern by its removal from the substrate 10 by various methods including chemical etching, mechanical milling or ion beam milling. In practice, actual removal need not occur as the magnetic film 12 may be separated by rendering it nonmagnetic by ion beam implantation. The patterns established by the removal of the film may be varied. However, in the preferred embodiment the pattern is an orthogonal, grate-like pattern which separates the film 12 into a plurality of magnetic post elements 14 formed as quadrilaterals or squares.

It may be seen that the orthogonal pattern includes a first set of separations running vertically or in the Y direction across the face of substrate 10, FIG. 1, and a second set of separations running horizontally or in the X direction across the substrate. A plurality of electrical conductors 16 are next deposited upon substrate 10 between the separations in the Y direction. This first set of conductors is deposited within every separation. A second set of conductors 18 is then deposited between every other separation in the X direction. It will be understood that before conductors 18 are deposited, it is necessary to provide an insulation layer between the upper surface of conductors 16 and newly deposited conductors 18. Typically, the thickness of conductors 16 and 18 is 1.25 um while a layer of silicon dioxide or polyimide 0.2 um thick may be deposited over the conductor 16 before the conductor 18 is deposited in the configuration shown in FIG. 1. Conductors 16 and 18 could be deposited upon a second substrate of transparent, nonmagnetic material and then aligned with the separations in another embodiment of the present invention.

From review of FIG. 1, it will now be seen that every other horizontal separation between the posts 14 is free of conductive material. Juxtaposed with each horizontal separation in which a horizontal conductor 18 is deposited are a plurality of first regions 20 consisting of low anisotropy materials which have been formed in the high anisotropy magnetic film by ion-implantation or laser annealing as taught by the co-pending patent application identified hereinabove. As seen in FIG. 1, the first regions 20 are located in the lower left-hand corners of the upper row of post elements 14. In this position, the first regions 20 of low anisotropy material are closest to the intersection of conductors 16 and the upper most conductor 18. The second row of post elements 14 is arranged with the first regions 20 in the upper left-hand corner so that these regions are again closest to the coincidence of conductors 16 and the upper most conductor 18.

It should be noted here that the conductors 16 and 18 need not be deposited neatly into the separation. Rather, the conductive material that forms the conductors 16 and 18 may be deposited up the sides of the separations and over the edge surface of post elements 14, thereby increasing the field from the conductors at the implanted site of first regions 20.

When an electrical current passes through the left most conductor 16 in a downward direction, it generates a magnetic flux about the conductor 16 in a counterclockwise direction, as viewed in FIG. 1. If a similar current is passed through the upper most conductor 18 from left to right, it will generate a magnetic flux in an upward direction through the left-hand post element 22 in the top row shown and in a downward direction through the left-hand post element 24 in the second row.

This flux pattern is shown schematically in FIG. 3a. Note that the magnetic flux generated by the downwardly directed current in conductor 16 and the current directed from left to right in conductor 18 produces two flux components in the upper right-hand quadrant which are directed toward the reader. The flux generated by conductor 16 is shown in a dashed circle while the flux generated by conductor 18 is shown in a solid circle. The flux generated in the upper left-hand quadrant and the lower right-hand quadrant of FIG. 3a tends to cancel as one of the components in each quadrant is directed away from the reader while one is directed toward the reader. The flux in the lower left-hand quadrant of FIG. 3a includes two components directed away from the reader. These components do not affect the magnetic material which forms post element 14 as the flux is not great enough to reverse the direction of magnetization of the high anisotropy material that forms the film 12 on post element 14. While the flux is great enough to reverse the low anistropy material in a first region, note that there is no first region 20 located in the lower left-hand quadrant of the intersection of conductors 16 and 18 as shown by post element 26 in FIG. 2.

When current is passed through the left most conductor 16 and upper conductor 18, FIG. 1, the generated flux field is impressed upon post element 22 to begin the reversal of direction of magnetization within the first region 20 since the anisotropy energy $K_u$ and thereby the anisotopy field $H_k$ has been reduced in the magnetic material of the first region 20 by ion-implantation. As a result, a 180° domain wall, not shown, is formed in first region 20 which separates regions of the magnetic material that exhibit opposite directions of magnetization. Continued application of the magnetic field propagates the domain wall to the very boundary of the first region 20. At the interface between the first region 20 and the magnetic film 12, the reversed direction of magnetization in the domain wall is sufficiently strong to also reverse the high anisotropy material of film 12 by sequential rotation (wall motion). The reversal then moves across the magnetic film 12 upon post element 14 to complete the reversal of the material upon post element 14. The full reversal of post element 14 is thus caused by the propagations of the domain wall and not by direct reversal from the conductor magnetic field.

The location of the first region of low anisotropy material is important to the present invention. In the present invention, the first region 20 may be located on the right or left-hand side of the post element 14. This is because the vertical conductors 16 are located in every separation between the post element 14. However, the first region may only be located on the lower edge of post element 22 or upper edge of the post element 24 which is adjacent to the horizontal conductor 18. As the conductor 18 is located in every other horizontal separation between the post elements 14, this limitation is true for successive horizontal rows of post elements. Thus, it is clear that the location of a first region 20 on post element 14 must be in a corner adjacent the intersection of conductors 16 and 18. A single conductor crossing is used to control two elements and not one, as in the prior art. The two low anistropy first regions used to control the two elements are placed, relative to the conductors 16 and 18, so that they lie on one side of the one conductor and on both sides of the other.

Referring now to the schematic diagram of FIG. 2, the operation of a magneto-optic device of the present invention will be described. In FIG. 2, post elements 14 are shown in a 6×6 matrix with 6 post elements located in 6 horizontal rows. Each element in turn forms a vertical column with the post element under it. The post elements 14 are separated by suitable spacings in which are located vertical conductors 16 and horizontal conductors 18. Suitable terminals 21 have been connected to each conductor. If one wished to display the letter "Y" on the 6×6 matrix, it can be done by impressing a magnetic field upon selected first regions 20 of post elements 14.

For example, if a current were passed from left-to-right through the upper most horizontal conductor 18 at the terminal and in the direction labeled "a" and a second current were passed in a downward direction through the vertical conductor 16 labeled "a'", a magnetic flux would be generated in the upper right-hand quadrant formed by the intersection of these two conductors which includes the flux generated by each conductor 16 and 18 in a direction pointing toward the reader. see FIG. 3a. This flux from each conductor adds and thus becomes great enough to reverse the magnetization within first region 20 and, by subsequent wall motion, reverse the magnetization of the post element 14 shown at 22. There will be no reversal of the direction of magnetization in the high anisotropy material of the post element 14 shown at 26 since there is no first region 20 to be affected by the flux in that quadrant. From reviewing FIG. 2, it will be seen that the passage of an electrical current over the right most vertical wire 16 also labeled "a'" will reverse the direction of magnetization of the post element shown at 28.

To complete the letter "Y" the post elements 30 and 32 in the second row, third and fifth columns must have their direction of magnetization reversed. This is accomplished by impressing an electrical current over the upper most horizontal wire 18 in a direction shown by the arrow "b" and impressing a current over the third and fifth conductors in the directions shown by the arrow labeled "b'".

As seen in FIG. 3b, the currents flowing in the directions indicated will cause the magnetic flux in the lower right-hand quadrant from each wire to add. This reverses the direction of magnetization in the first region 20 of each post element 30 and 32. Similarly, a current impressed across the second horizontal conductor labeled "c" from left to right and down the fourth horizontal conductor labeled "c'" will cause the post element 34 in the third row, fourth column to reverse its direction of magnetization. This sequential switching is continued until the post elements 36 and 38, in row four, column four and row five, column four, have been exposed to a magnetic field which causes a reversal of their direction of magnetization by currents in the direction labeled "d" and "d'" and "e" and "e'". It should again be emphasized that the currents in conductors 16 and 18, as illustrated in FIGS. 3a and 3b, can be used to switch each post element 14 in one of two directions of magnetization without interfering with the direction of magnetization of any surrounding post element.

When it is desired to return the magneto-optic display to a neutral position, i.e., all white or all black, the sequence described above may be reversed or all of the post elements 14 may be exposed to an external bias magnetic field. Since it is generally desirable to eliminate, as much as possible, the need for additional current, the preferred embodiment follows a sequencing pattern.

While the preferred embodiment has been described with square post elements and orthogonally arranged conductors, it will be noted that any quadrilaterally configured post element may be used with conductors arranged at any suitable angle. Further either set of separation between the post elements may include the conductors in every other separation. The important feature of the present invention is the recognition that half of the horizontal or vertical conductors may be eliminated by the appropriate positioning of the first regions 20 having low anisotropy material. These first regions shall be located in close juxtaposition to the intersection of the horizontal and vertical conductors 16 and 18.

I claim:

1. A magneto-optic device having a plurality of post elements formed upon a nonmagnetic substrate from a material that exhibits magnetic domain characteristics having grid-like separations between said post elements, comprising:
    said material forming said post elements having a high anisotropy characteristic with a first relatively small surface region in said material having a low anisotropy characteristic;
    said grid-like separations positioned between said post elements in a first and second direction;
    conductor means aligned with each of said grid-like separations between said post elements in said first direction of said separation and with every other of said grid-like separations in said second direction of said separation to form intersecting conductor means, and
    said first relatively small surface region in said material located within each of said post elements in juxtaposition to said intersecting conductor means.

2. A magneto-optic device, as claimed in claim 1, wherein:
    said first and second directions of said grid-like separations are orthogonal;
    said post elements are quadrilateral; and
    said first region is located within a corner of said quadrilateral post element adjacent to said intersecting conductor means.

3. A magneto-optic device, as claimed in claim 2, wherein:
    said post elements are square.

4. A plurality of magnetic post elements formed upon a non-magnetic substrate, comprising:
    said plurality of post elements formed from magnetic material having high anisotropy characteristics with orthogonal separations therebetween to form a grid-like pattern of separations in a first and second direction;
    each post element having a first region in said magnetic material with a low anisotropy characteristic compared to said magnetic material;
    conductor means mounted upon said nonmagnetic substrate within said orthogonal separations having conductor means in each separation in said first direction of said grid-like pattern and conductor means in every other separation in said second direction of said grid-like pattern; and
    said first regions located in a corner of each of said post elements closest to a selected set of said conductor means in said first direction and closest to each of said conductor means in said second direction.

5. A plurality of magnetic post elements, as claimed in claim 4, wherein:
    said first direction of said conductor means is vertical with said conductor means in each of said vertical separations and said second direction of said conductor means is horizontal with said conductor means in every other horizontal separations.

6. A plurality of magnetic post elements, as claimed in claim 5, wherein:
said first regions located in said corner of each of said post elements are located on the left-hand side of said post elements and closest to said every other horizontal conductor.

7. A plurality of magnetic post elements, as claimed in claim 5, wherein:
said first regions located in said corner of each of said post elements are located on the right-hand side of said post elements and closest to said every other horizontal conductor.

8. A plurality of magnetic post elements, as claimed in claim 4, wherein:
said magnetic post elements are magneto-optic post elements.

9. A plurality of magnetic post elements, as claimed in claim 4, wherein:
said first direction of said conductor means is horizontal with said conductor means in each of said horizontal separations and said second direction of said conductor means is vertical with said conductor means in every other vertical separation.

10. A plurality of magnetic post elements, as claimed in claim 9, wherein:
said first regions located in said corner of each of said post elements are located on the upper edge of said post elements and closest to said every other vertical conductor.

11. A plurality of magnetic post elements, as claimed in claim 9, wherein:
said first regions located in said corner of each of said post elements are located on the lower edge of said post elements and closest to said every other vertical conductor.

12. A plurality of magnetic post elements, as claimed in any of claims 5 or 9, wherein:
said post elements are quadrilateral.

13. A plurality of magnetic post elements, as claimed in any of claims 5 or 9, wherein:
said post elements are square.

14. A method to reduce the number of conductors required to switch the direction of magnetization of a magnetic material separated into a plurality of magnetic post elements upon a nonmagnetic substrate, comprising the steps of:
placing a magnetic material having high anisotropy upon said substrate to form grid-like separations therebetween having separations in first and second directions;
placing a conductive material in said grid-like separations with said conductive material placed in every separation in said first direction and in every other separation in said second direction; and
placing a first region in said magnetic material having a low anisotropy relative to said high anisotropy of said magnetic material in a corner of each of said post element nearest to the intersection of said conductor material in said first and second directions.

15. A method to reduce the number of conductors, as claimed in claim 14, wherein the steps additionally comprise:
placing a transparent magnetic material in an orthogonal pattern to form square post elements upon a transparent substrate thus forming magneto-optic elements.

* * * * *